United States Patent
McClendon

(10) Patent No.: US 11,405,667 B2
(45) Date of Patent: Aug. 2, 2022

(54) METHOD FOR SERVING INTERACTIVE DIGITAL ADVERTISING CONTENT WITHIN A STREAMING PLATFORM

(71) Applicant: Yieldmo, Inc., New York, NY (US)

(72) Inventor: Terry McClendon, New York, NY (US)

(73) Assignee: Yieldmo, Inc., Nashua, NH (US)

( * ) Notice: Subject to any disclaimer, the term of this patent is extended or adjusted under 35 U.S.C. 154(b) by 0 days.

(21) Appl. No.: 17/349,570

(22) Filed: Jun. 16, 2021

(65) Prior Publication Data

US 2021/0400321 A1 Dec. 23, 2021

Related U.S. Application Data

(60) Provisional application No. 63/040,447, filed on Jun. 17, 2020.

(51) Int. Cl.
*H04N 21/234* (2011.01)
*H04N 21/2343* (2011.01)
*H04N 21/81* (2011.01)
*H04N 21/44* (2011.01)

(52) U.S. Cl.
CPC ........ *H04N 21/234345* (2013.01); *H04N 21/23424* (2013.01); *H04N 21/44016* (2013.01); *H04N 21/812* (2013.01)

(58) Field of Classification Search
CPC ..... H04N 21/234345; H04N 21/23424; H04N 21/44016; H04N 21/812
See application file for complete search history.

(56) References Cited

U.S. PATENT DOCUMENTS

| | | | | |
|---|---|---|---|---|
| 9,066,122 | B1* | 6/2015 | Rattazzi | H04N 21/44204 |
| 9,154,722 | B1* | 10/2015 | Muniyandi | H04N 21/47217 |
| 9,167,312 | B2* | 10/2015 | Archer | H04N 21/4147 |
| 2002/0100041 | A1* | 7/2002 | Rosenberg | H04N 21/25891 |
| | | | | 725/32 |
| 2002/0174430 | A1* | 11/2002 | Ellis | H04N 21/47 |
| | | | | 725/46 |
| 2007/0162951 | A1* | 7/2007 | Rashkovskiy | H04N 21/4408 |
| | | | | 725/134 |
| 2007/0300263 | A1* | 12/2007 | Barton | H04N 21/4325 |
| | | | | 725/60 |

(Continued)

*Primary Examiner* — Jefferey F Harold
*Assistant Examiner* — Timothy R Newlin
(74) *Attorney, Agent, or Firm* — Run8 Patent Group, LLC; Peter Miller; Leah Raddatz

(57) ABSTRACT

One variation of a method for serving interactive ad content includes, in response to a pause event that pauses playback of a digital video, viewed on a display of a streaming device accessed by a user: overlaying the digital video with a home screen including an image player and a set of icons linked to a set of video advertisements; in response to a first user input proximal an icon, in the set of icons, corresponding to a video advertisement, in the set of video advertisements, reconfiguring the image player and initiating playback of the video advertisement within the image player; during playback of the video advertisement, in response to a second user input proximal the icon, expanding the image player and activating an audio stream of the video advertisement; and, in response to a user input that resumes playback of the digital video, pausing playback of the video advertisement.

1 Claim, 1 Drawing Sheet

(56) References Cited

U.S. PATENT DOCUMENTS

| | | | | |
|---|---|---|---|---|
| 2008/0263583 A1* | 10/2008 | Heath | ............ | G06Q 30/02 |
| | | | | 725/32 |
| 2010/0083304 A1* | 4/2010 | Pan | ............ | H04N 21/4622 |
| | | | | 725/34 |
| 2011/0145856 A1* | 6/2011 | Agarwal | ............ | H04N 21/6581 |
| | | | | 725/32 |
| 2013/0086607 A1* | 4/2013 | Tom | ............ | H04N 21/25891 |
| | | | | 725/32 |
| 2013/0347032 A1* | 12/2013 | Geraci | ............ | H04N 21/4884 |
| | | | | 725/34 |
| 2015/0113560 A1* | 4/2015 | McCoy | ............ | H04N 21/6125 |
| | | | | 725/32 |
| 2015/0150042 A1* | 5/2015 | Hwang | ............ | H04N 21/812 |
| | | | | 725/32 |
| 2020/0099977 A1* | 3/2020 | Korn | ............ | H04N 21/23424 |
| 2021/0127160 A1* | 4/2021 | Abe | ............ | H04N 21/4415 |

* cited by examiner

S110
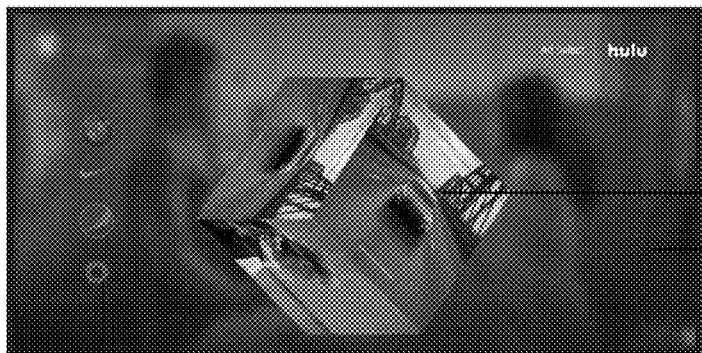
(image player)
(home screen)
S100
(set of icons)
S120
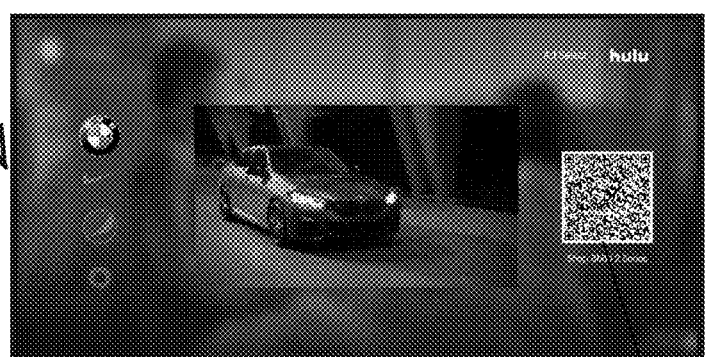
(QR code)
S130
(primary content stream)
S140

METHOD FOR SERVING INTERACTIVE DIGITAL ADVERTISING CONTENT WITHIN A STREAMING PLATFORM

CROSS-REFERENCE TO RELATED APPLICATIONS

This Application claims the benefit of U.S. Provisional Application No. 63/040,447, filed on 17 Jun. 2020, which is incorporated in its entirety by this reference.

TECHNICAL FIELD

This invention relates generally to the field of digital advertising and more specifically to a new and useful method for serving interactive content in the field of digital advertising.

BRIEF DESCRIPTION OF THE FIGURES

FIG. 1 is a flowchart representation of a first method.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

As shown in FIG. 1, a method S100 includes during a first pause event that pauses playback of a primary content stream—viewed on a display of a streaming device (e.g., television, computer, mobile phone) associated with a user—at a first frame in a digital video in the primary content stream: overlaying the first frame of the primary content stream with a home screen of an ad stream in Block S110, the home screen including an image player in a first subregion of the home screen, defining a responsive transformation, and including a set of icons selectable by the user and linked to a set of video advertisements.

The method also includes, in response to detecting a first user input proximal a first icon, in the set of icons, corresponding to a first video advertisement in the set of video advertisements: reconfiguring the image player to a second subregion of the home screen according to the responsive transformation; and initiating playback of a first segment of the first video advertisement from a first frame in the first video advertisement to a second frame succeeding the first frame within the image player in Block S120.

The method S100 further includes, in response to detecting a second user input proximal the first icon: expanding the image player across the home screen; activating an audio stream of the first video advertisement; and continuing playback of the first video advertisement from the second frame to a third frame succeeding the second frame in the first video advertisement within the image player in Block S130.

The method S100 also includes, in response to a user input that resumes playback of the primary content stream: pausing playback of the first video advertisement; rendering the first frame in the digital video of the primary content stream in replacement of the ad stream; terminating the first pause event; and resuming playback of the digital video in the primary content stream in Block S140.

In one variation, the method S100 further includes, during a second pause event that pauses playback of the primary content stream at a second frame in the digital video succeeding the first frame: overlaying the first frame of the primary content stream with the home screen of the ad stream, the image player in the second subregion; initiate playback of a second segment of the first video advertisement from the third frame of the video advertisement to a fourth frame in the video advertisement; and, in response to detecting a third user input proximal the first icon, expanding the image player across the home screen; activating the audio stream of the first video advertisement; and continuing playback of the first video advertisement from the fourth frame to a fifth frame succeeding the fourth frame in the first video advertisement within the image player.

In one variation, the method S100 further includes: during the first pause event, rendering a QR code adjacent the second subregion within the home screen, the QR code linked to the ad stream; and, in response to the user capturing the QR code at a mobile device associated with the user, continuing playback of the first video advertisement from the second frame in the first video advertisement at the mobile device.

2. Applications

Generally, the method S100 can be executed by an advertising (or "ad") platform: to serve an interactive ad stream to a user—viewing a primary video streaming content (e.g., videos, a television show, a movie) on a streaming device (e.g., Smart TV, computing device, mobile phone)—while this primary video streaming content is paused; and to selectively increase screen area allocated to an ad within the interactive ad stream and selectively activate an audio stream for the ad responsive to passive and active user inputs.

In particular, the method S100 can be executed by an ad platform (and/or an ad tech vendor, a publisher, an ad agency, or an online social networking platform, etc.)—in combination with a video streaming platform (e.g., an ad-supported streaming service)—to: render an ad stream responsive to pauses or breaks in the primary content stream initiated by the user; present the user with a selection of video advertisements in an interactive (and motive) format; and tailor ad content served to the user based on the user's selection of video advertisements within the ad stream. For example, during a pause event in the primary content stream, the ad platform and video streaming platform can: render a home screen of an ad stream over the paused primary content stream; concurrently render multiple distinct, silent video advertisements within small, moving tiles (e.g., over facets of a rotating cube) and corresponding icons within the ad home screen; expand a first video advertisement within the set to a large region of the home screen when a cursor is moved near a corresponding icon or near the corresponding tile; and then expand the first video advertisement to fill the home screen and activate an audio stream for the first video advertisement when the corresponding icon or the first advertisement itself is selected. The ad platform and video streaming platform can then store a stop time of the first video advertisement, close the ad home screen, and resume playback of the primary content stream responsive to a "play" input from the user. The ad platform and video streaming platform can also: resume silent playback of the first ad from the stored stop time—within the ad home screen overlayed on the primary content stream—responsive to a subsequent pause event at the primary content stream; and reactivate the audio stream of the first ad responsive to further input from the user.

Therefore, the ad platform—in combination with the streaming platform—can serve the user an interactive ad stream (hereinafter "ad stream") during events (or "pause events") initiated by the user. By serving the ad stream to the user during pause events—rather than at regular scheduled intervals throughout the primary content stream—the ad platform can minimize inconvenience to the user and increase a likelihood of higher user engagement with ad content viewed during an ad stream. For example, if a user and her roommate are streaming a TV show together, and her roommate needs to take their dog outside, the user may pause the TV show (or "primary content stream") and the ad platform can render the ad stream in replacement of the primary content stream. The user may be more likely to engage with video advertisements presented to her during this ad stream (e.g., while her roommate is outside with their dog) than she would during a regularly scheduled video advertisement interrupting the primary content stream while her roommate is still watching with her.

Therefore, the ad platform can cooperate with a streaming platform to serve to a user video advertisements tailored to the user's interests, thus increasing the likelihood of achieving a target outcome (e.g., brand lift, conversion, video completion) associated with the video advertisements. Further, by enabling the user to control playback of video advertisements (e.g., when video advertisements are played, duration of video advertisements, content of video advertisements), the ad platform can increase likelihood that the user will engage with advertising content and minimize frustration experienced by the user due to video advertisements interrupting the primary content stream.

3. Example: User Experience

The ad platform—in combination with a streaming platform—can serve an interactive ad stream during an event (e.g., a "pause" event) initiated by the user while viewing streaming content on a streaming device. For example, a user may enter a selection (e.g., via her TV remote control) of streaming content (e.g., a television show, a movie, a video short) to watch on her television via a streaming platform (e.g., an ad-supported streaming service). In response to receiving her selection, the streaming platform can initiate playback of a video stream corresponding to the user's selection (hereinafter a "primary content stream"). Later, while viewing the selected primary content stream, the user may pause playback of the primary content stream. This "pause" event, initiated by the user, triggers the ad platform to serve to the user an ad stream in replacement of the primary content stream.

During the pause event, the ad platform can render a home screen of the ad stream configured to present the user with a set of video advertisements from which the user may select a video advertisement for viewing. The home screen can include: an image player configured to render playback of the set of video advertisements and defining a responsive transformation; and a set of icons, each icon corresponding to a video advertisement in the set of video advertisements. At the home screen, the user may manipulate a pointer (e.g., cursor, television remote) to preview, select, and/or view a particular video advertisement, in the set of video advertisements, by interacting with the set of icons.

At a first pause level of the pause event, triggered by initiation of the pause event, the ad platform can present the image player at a first subregion of the home screen. The image player can be configured to concurrently render a set of video advertisements, each distinct video advertisement in the set of video advertisements rendered within a tile of the image player. At the first pause level, the ad platform renders these video advertisements within the image player without audio. By initially presenting these video advertisements without audio, the ad platform can accommodate users who may have paused the primary content stream to take a phone call or converse with other viewers. Therefore, in order to increase the user's interest in these silent video advertisements, presented concurrently within the image player, the ad platform can animate the tiles (e.g., over facets of a rotating cube) to present moving video advertisements to the user in order to draw the user's attention and prompt an interaction and/or selection of a video advertisement. Further, by presenting multiple video advertisements concurrently within the image player, and therefore at low resolution, the ad platform can entice the user to further interact with or select a video advertisement for viewing at a higher resolution.

In this example, the user may be enticed by a first video advertisement rendered within a first tile of the image player. To preview the first video advertisement, the user may hover her cursor over a first icon, in the set of icons, corresponding to the first video advertisement. (Alternatively, for another user viewing on his mobile device, the user may tap on the first icon). In response to the user hovering her cursor over the first icon, the ad platform can detect a first user input proximal the first icon.

At a second pause level of the pause event, triggered by the first user input proximal the first icon, the ad platform can reconfigure the image player from the first subregion to a second subregion of the home screen. The ad platform can reconfigure (e.g., modify shape, size, and/or placement of) the image player to render the first video advertisement within an expanded window. At the second pause level, the image player renders only the first (or selected) video advertisement within the image player. The ad platform can initiate playback of the first video advertisement within the image player. In addition, the ad platform can render the set of icons adjacent the image player, such that the user may elect to switch to a different video advertisement during playback of the first video advertisement. Therefore, at the second pause level, the ad platform enables the user to preview the first video advertisement at a higher resolution than at the first pause level, while enabling the user to switch to a different video advertisement if the user is not actually interested in the first video advertisement. Thus, the ad platform can verify the user's interest in the first video advertisement and enable the user to search for a video advertisement that the user finds most interesting.

However, if the user wishes to continue viewing the first video advertisement, then the user may locate her cursor over the first icon and click. (Alternatively, for another user viewing on his mobile device, the user may enter a second tap on the first icon). In response to the user clicking on the first icon, the ad platform can detect a second user input proximal the first icon.

Finally, at a third pause level of the pause event, triggered by the second user input proximal the first icon, the ad platform can expand the image player across the home screen (e.g., without the set if icons). Additionally and/or alternatively, the ad platform can automatically expand the image player across the home screen response to the user viewing the first video advertisement at the second pause level for more than a threshold duration. At the third pause level, the ad platform can activate an audio stream of the first video advertisement and continue playback of the first video advertisement within the image player such that the user may view the complete first video advertisement.

While viewing playback of the first video advertisement on her streaming device, the user may: continue viewing (full-screen) playback of the first video advertisement; exit playback of the first video advertisement to return to the home screen of the ad stream; and/or exit the ad stream and return to playback of the primary content stream.

Within the ad stream, the image player can render a QR code corresponding to the ad stream on the display of the user's streaming device. The user may capture an image of the QR code with a camera built into her mobile device to access the ad stream on her mobile device. Thus, if the user wishes to resume playback of the primary content stream but also finish viewing the first video advertisement or learn more about content within the first video advertisement, the user may scan the QR code with the camera on her mobile device, press "play" on her TV remote control to resume playback of the primary content stream, and continue playback of the first video advertisement on her mobile device. Similarly, the ad platform can render additional icons (e.g., QR codes, images, links) on the display of the streaming device within the ad stream configured to link the user to content (a webpage associated with a product advertised, a webpage corresponding to a brand) related to video advertisements viewed by the user within the ad stream.

Later, in response to a second pause event initiated by the user during the primary content stream, the ad platform can automatically load a last frame of the first video advertisement viewed by the user and continue playback of the first video advertisement from this frame at the second pause level. However, if the user completed playback of the first video advertisement during the first pause event, then the ad platform can automatically select a second video advertisement to serve to the user that is related to the first video advertisement, such as a continuation of a plotline presented in the first video advertisement. Alternatively, the ad platform can render the home screen (e.g., at the first pause level) at the start of each pause event and enable the user to select a new video advertisement or continue playback of a previously viewed video advertisement.

3. Interactive Ad Stream

During a first pause event, initiated by the user, the ad platform can serve an ad stream to the user in replacement of the primary content stream. More specifically, in response to initiation of the pause event, the ad platform can render a home screen of the ad stream configured to enable the user to navigate the ad stream, interact with advertising content, and select video advertisements within the ad stream for viewing. The home screen can include an image player configured to present advertising content to the user and a set of icons (e.g., controls) configured to receive user inputs (e.g., selections) of advertising content.

The home screen can include an image player configured to render and/or play video advertisements available to the user within the ad stream. The image player can be configured to render frames or playback of a single video advertisement or of multiple video advertisements simultaneously and to transform (e.g., in shape, size, orientation, color) to present video advertisements in different formats responsive to user inputs. More specifically, the ad platform can reconfigure the image player to different subregions of the home screen responsive to user inputs at the home screen, such as by reconfiguring the shape, size, and/or location of the image player within the home screen.

For example, in response to a first pause event, the ad stream can render the home screen over a paused frame of the primary content stream. The home screen can include a set of icons (e.g., controls) corresponding to a set of video advertisements and configured to receive user inputs, and an image player in a first subregion of the home screen, the image player defining a 3D cube having six tiles, each tile of the cube configured to render advertising content (e.g., static images, videos) corresponding to the set of video advertisements available to the user for viewing within the ad stream. In this example, the cube can be configured such that a first tile of the cube renders a first video advertisement in the set of video advertisements, a second tile of the cube renders a second video advertisement in the set of video advertisements, a third tile of the cube renders a third video advertisement in the set of video advertisements, and so on. Further, the cube can be animated (e.g., moving, rotating, rolling) according to a responsive transformation, such that each tile of the cube may be viewed by the user. Then, in response to the user locating a pointer over a first icon corresponding to the first video advertisement, the ad platform can reconfigure the image player according to a second subregion of the home screen, such that the image player defines an expanded window of one tile corresponding to the first video advertisement. The ad platform can then initiate playback of the first video advertisement within this expanded window with frames of the first video advertisement matched to a size of the expanded window.

The home screen can include a set of icons configured to receive user inputs, each icon corresponding to a video advertisement in a set of video advertisements available to the user within the ad stream. The user may enter an input or "select" an icon by locating a pointer (e.g., moving a cursor on the display, toggling the pointer via remote control) on or over the icon. Each icon in the set of icons can be configured to trigger playback of the video advertisement corresponding to each icon responsive to receiving a user input. Further, each icon can be configured to generate feedback (e.g., a sound, an animation) to the user responsive to a user input on or over the icon, such as generating a sound and/or transforming according to a responsive animation (e.g., expand in size, change color, increase opacity) defined by each icon.

In one implementation, each icon can be configured to receive multiple types of user inputs and trigger a response according to the type of user input. For example, the ad platform can render the home screen including a set of icons (e.g., four icons), each icon corresponding to a particular video advertisement. Responsive to the user locating her pointer on or over a first icon corresponding to a first video advertisement, the ad platform can expand a size and increase a brightness of the first icon according to a responsive animation defined by the set of icons. Simultaneously, in response to the user locating her pointer over the first icon, the ad platform can trigger the image player to initiate playback of the first video advertisement, the image player defining a rectangular frame, frames of the first video advertisement configured to match a size of the rectangular frame. Then, in response to the user clicking on the first icon, the ad platform can: generate a sound indicating confirmation of the "click" over the first icon; trigger the image player to continue playback of the first video ad; and expand the image player across the home screen (e.g., to full-screen view).

In one implementation, the ad platform renders the home screen over a paused frame of the primary content stream. The home screen includes the image player configured to render advertising content (e.g., static images, video) and the set of icons configured to receive user inputs, and can define a background layer. In this implementation, the background layer can define an opacity level (e.g., 50 percent, 75 percent) such that the paused frame of the primary content stream is viewable through the background layer.

3.1 Exiting the Ad Stream

The ad platform can exit the ad stream and return to the primary content stream responsive to inputs from the user. In one implementation, the ad stream enables immediate return to the primary content stream responsive to a particular input by the user, such as responsive to the user clicking on a particular icon corresponding to the primary content stream and rendered over the ad stream or clicking the "play" button on the television remote twice consecutively. For example, at a first time, in response to receiving a selection of an episode of a television show by a user at her streaming device (e.g., the user's smart TV), the ad platform can render a first frame of a primary content stream corresponding to the episode selected by the user and initiate playback of the primary content stream from the first frame. Then, at a second time, in response to the user pausing the primary content stream at a second frame succeeding the first frame in the primary content stream, the ad platform can serve the ad stream to the user in replacement of the primary content stream. Upon receiving a selection of a first video advertisement from the user at the streaming device (e.g., the user's Smart TV), the ad platform can initiate playback of the first video advertisement. Then, at a second time, in response to receiving an input from the user indicating the user wishes to return to the primary content stream, the ad platform can: pause playback of the first video ad; exit the ad stream; render the second frame in the primary content stream; and initiate playback of the primary content stream from the second frame. Therefore, the ad platform enables the user to control switching between playback of the primary content stream and the ad stream, thus enabling the user to continue viewing advertising content in the ad stream when the user is engaged in this content and to switch back to viewing the primary content stream (e.g., the user's selected TV episode) when the user is less engaged or wishes to switch back to her selected content.

In one variation, the ad platform exits the ad stream and returns to the primary content stream responsive to an input from the user, upon completion of playback of a video advertisement (e.g., from a first frame in the video advertisement to a last frame in the video ad). In this variation, the ad platform can automatically exit the ad stream upon completion of playback of the video advertisement and render a particular (paused) frame of the primary content stream corresponding to the last frame of the primary content stream viewed by the user (e.g., before switching to the ad stream). Alternatively, the ad platform can return to the video advertisement home screen upon completion of playback of the video advertisement.

3.2 Switching Between Primary Content Stream & Ad Stream

The ad platform can intermittently render the ad stream over or in replacement of the primary content stream throughout a duration of the content stream, such as in response to pause events initiated by the user and/or in response to scheduled ad breaks within the primary content stream.

In one variation, the ad platform can automatically continue playback of a video advertisement selected by the user across multiple ad stream segments. For example, in response to a first pause event, the ad platform can serve the user a first ad stream segment in replacement of a first primary content stream segment. During the first ad stream segment, the ad platform can render the home screen of the video advertisement stream to the user and initiate playback of a first video advertisement from a first frame in the first video advertisement responsive to a selection input by the user at the home screen. Then, in response to the user selecting playback of the primary content stream, the ad platform can: pause playback of the first video advertisement at a second frame in the first video advertisement succeeding the first frame; terminate the first ad stream segment; and initiate playback of a second primary content stream segment. Then, at a later time, in response to a second pause event, the ad platform can serve the user a second ad stream segment in replacement of the second primary content stream segment. During the second ad stream segment, the ad platform can automatically load the second frame of the first video advertisement into the image player and initiate playback of the first video advertisement from the second frame. The ad platform can also enable the user to return to the ad stream home screen to select a different video advertisement, such as by rendering an icon configured to receive a user input and linked to the home screen. Therefore, the ad platform can continue playback of the same video advertisement across multiple ad stream segments based on the user's initial selection, thus tailoring ad content to the user's interests and increasing the likelihood of achieving a target outcome (e.g., brand lift, video completion, conversion) for this user with this video advertisement, while minimizing inconvenience or effort required by the user.

In another variation, in response to a second pause event, the ad platform can enable the user to select between continuing playback of the first video advertisement selected by the user during the first pause event or selecting a new video advertisement. Alternatively, the ad platform can automatically render the home screen, in response to each pause event, at the start of each ad stream segment.

4. Secondary Device

In one variation, the ad platform can enable the user to view the ad stream on multiple streaming devices. The ad platform can render a QR code on a display of the user's streaming device on the home screen of the ad stream, during playback of video advertisements in the ad stream, and/or during playback of the primary content stream such that the user may access the ad stream on a secondary device (e.g., her smartphone) by capturing an image of the QR code on the secondary device.

For example, the user can open a native application of a streaming platform on her smart TV (e.g., via her TV remote) and select a movie for viewing with her partner at home. Upon receiving her selection, the streaming platform can render a first frame of the primary content stream on a display of her Smart TV and initiate playback of the primary content stream from the first frame. After a first duration, the user may pause playback of the primary content stream at a second frame succeeding the first frame while her partner goes to the kitchen to make a snack. Upon detecting this "pause" event, the ad platform can overlay the second frame of the primary content stream with the home screen of the ad stream. Then, upon receiving a selection of a first video advertisement for backpacking gear from a sporting goods retailer, the ad platform can initiate playback of the first video advertisement from a first frame in the video advertisement. The ad platform can also render a QR code on the Smart TV display (e.g., overlaid a portion of the video advertisement, on a side of the video ad) linked to this ad stream. When the user's partner returns from the kitchen to continue viewing the movie, she may wish to continue viewing the first video advertisement to see a particular deal or gain additional insight regarding the backpacking gear advertised. The user may take a photo of (or aim a camera at) the QR code rendered on the Smart TV display with a camera built into her mobile device if she wishes to continue viewing the first video advertisement on her mobile device. Then, in response to an input entered by the user, the ad platform can pause playback of the first video advertisement at a second frame succeeding the first frame in the first video advertisement, render the second frame of the primary content stream on the display, and resume playback of the primary content stream. In response to the user taking a photo of (or aiming her camera at) the QR code, her mobile phone may prompt the user to (or automatically) open a particular website or native application (e.g., a native application associated with the ad platform, the native application of the streaming platform) configured to continue playback of the ad stream. Once the user opens this website or native application, the ad platform can continue playback of the first video advertisement from the second frame of the first video advertisement. The ad platform can enable the user to access the home screen of the ad stream during playback of the first video advertisement and enable selection of other video advertisements from the home screen on her mobile device.

Additionally and/or alternatively, the ad platform can enable the user to select an icon (e.g., the QR code, an image) configured to open a website or native application linked to the ad stream. For example, a user viewing streaming content on her laptop or smartphone may click on an icon configured to open a webpage at which the user may purchase a product advertised to the user in the ad stream.

5. Scheduled Video Advertisement Segments

In one variation, the ad platform can serve to the user scheduled video advertisement segments throughout a content stream in addition to serving to the user the interactive ad stream during "pause" events. The ad platform can segment the primary content stream into discrete segments and insert these scheduled video advertisement segments between segments of the primary content stream to generate a content stream.

For example, for a primary content stream exhibiting a duration of twenty-four minutes, the ad platform can segment the primary content stream into four discrete primary content segments including: a first primary content segment exhibiting a first duration of ten minutes; a second primary content segment exhibiting a second duration of five minutes; a third primary content segment exhibiting a third duration of five minutes; and a fourth primary content segment exhibiting a fourth duration of four minutes. The ad platform can then inject scheduled video advertisement segments between each primary content segment to generate a continuous content stream exhibiting a total duration of 30 minutes, including twenty-four minutes of the primary content stream and six minutes of scheduled video advertisement segments.

However, in one variation, the ad platform can adjust a duration of the scheduled video advertisement segments based on a duration of time the user spends viewing and/or interacting with the ad stream. In this variation, during pause events (e.g., while the ad stream is rendered on the display), the ad platform can track a set of ad stream metrics such as: a duration spent within the ad stream (or a duration of the pause event); a duration spent viewing playback of a particular ad; a number of video advertisements viewed by the user; which video advertisements the user selected and/or viewed; a completion rate for each video advertisement viewed (e.g., percentage of a video advertisement the user completed before exiting the video ad); etc. The ad platform can then access these ad stream metrics to adjust distribution and/or durations of scheduled video advertisement segments.

For example, the ad platform can initially schedule three scheduled video advertisement segments within a content stream, each scheduled video advertisement segment exhibiting a duration of 90 seconds, such that the content stream includes four discrete primary content segments, each separated by a 90-second scheduled video advertisement segment. However, if the user pauses the primary content stream during the third primary content segment (after viewing the first and second scheduled video advertisement segment), then the ad platform can serve to the user the ad stream in replacement of the primary content stream during this pause event. Upon serving to the user the ad stream, the ad platform can initiate a timer to track a duration of this pause event. During the pause event, the user may preview video advertisements within the ad stream and/or select video advertisements she wishes to view to initiate playback of these video advertisements. Then, when the user is ready to return to the primary content stream, she may select the primary content stream (e.g., by pressing the "play" button on her TV remote, by selecting a particular icon rendered on the display and linked to the primary content stream). Responsive to the user selection, the ad platform can: stop the timer and record the duration of the pause event; exit the ad stream; and continue playback of the third segment of the primary content stream. Then, upon completing playback of the third segment of the primary content stream, the ad platform can: access the recorded duration (e.g., two minutes) of the pause event; access a duration of the third scheduled video advertisement segment (e.g., 90 seconds); and, in response to recorded duration of the pause event exceeding the duration of the third scheduled video advertisement segment, skip the third scheduled video advertisement segment and initiate playback of the fourth segment of the primary content stream. Alternatively, the ad platform can reduce the duration of the third scheduled video advertisement segment (e.g., from 90 seconds to 30 seconds) based on the recorded duration of the pause event.

In one variation, the ad platform can update the content (or video advertisements) served to the user during scheduled video advertisement segments based on user selections and/or interactions with advertising content in the ad stream. For example, for a particular content stream, the ad platform can initially schedule a scheduled video advertisement segment including a placeholder video advertisement related to a car brand after a first primary content segment. During playback of the first primary content segment, in response to a pause event, the ad platform can serve the ad stream to the user in replacement of the primary content stream, including a selection between a first video advertisement related to sporting goods and a second video advertisement related to a car brand. In response to selection of the first video advertisement related to sporting goods, the ad platform can initiate playback of the first video advertisement. Then, in response to termination of the pause event by the user, the ad platform can pause playback of the first video advertisement and serve the user the primary content stream in replacement of the ad stream. Then, upon completion of playback of the first primary content segment, the ad platform can resume playback of the first video advertisement during the first scheduled video advertisement segment in replacement of the placeholder video advertisement related to the car brand. Alternatively, the ad platform can select a new video advertisement to serve to the user during this scheduled video advertisement segment that better fits the user's interests as indicated by the selection of the first video advertisement related to sporting goods and/or by the user's historical selections and/or interactions with video advertisements in the ad stream.

Therefore, by serving an interactive ad stream to the user responsive to user inputs (e.g., pause events) in combination with scheduled video advertisement segments automatically included in the content stream, the ad platform can tailor content included in these scheduled video advertisement segments to better fit the user's interests and thus increase the likelihood of achieving a particular advertising outcome (e.g., brand lift, conversion). The ad platform can also reduce a duration and/or quantity of scheduled video advertisements interrupting the content stream by enabling the user to select and view video advertisements during user-initiated breaks (e.g., pause events), thus decreasing inconvenience to the user and increasing a likelihood of user engagement with advertising content included in the video advertisements.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method comprising:
   during a first pause event that pauses playback of a primary content stream at a first frame in a digital video in the primary content stream, the primary content stream viewed on a display of a streaming device associated with a user:
     overlaying the first frame of the primary content stream with a home screen of an ad stream, the home screen including an image player in a first subregion of the home screen, defining a responsive transformation, and including a set of icons selectable by the user and linked to a set of video advertisements;
     in response to detecting a first user input proximal a first icon, in the set of icons, corresponding to a first video advertisement in the set of video advertisements:
       reconfiguring the image player to a second subregion of the home screen according to the responsive transformation; and
       initiating playback of a first segment of the first video advertisement from a first frame in the first video advertisement to a second frame succeeding the first frame within the image player; and
     in response to detecting a second user input proximal the first icon:
       expanding the image player across the home screen;
       activating an audio stream of the first video advertisement; and
       continuing playback of the first video advertisement from the second frame to a third frame succeeding the second frame in the first video advertisement within the image player;
   in response to a user input that resumes playback of the primary content stream:
     pausing playback of the first video advertisement;
     rendering the first frame in the digital video of the primary content stream in replacement of the ad stream;
     terminating the first pause event; and
     resuming playback of the digital video in the primary content stream; and
   during a second pause event that pauses playback of the primary content stream at a second frame in the digital video succeeding the first frame:
     overlaying the second frame of the primary content stream with the home screen of the ad stream, the image player in the second subregion;
     initiating playback of a second segment of the first video advertisement from the third frame to a fourth frame in the first video advertisement; and
     in response to detecting a third user input proximal the first icon:
       expanding the image player across the home screen;
       activating the audio stream of the first video advertisement; and
       continuing playback of the first video advertisement from the fourth frame to a fifth frame succeeding the fourth frame in the first video advertisement within the image player.

* * * * *